June 6, 1933.　　　　E. R. EVANS　　　　1,912,831
BOOT FOR BRAKES
Filed Nov. 10, 1930　　　　2 Sheets-Sheet 1
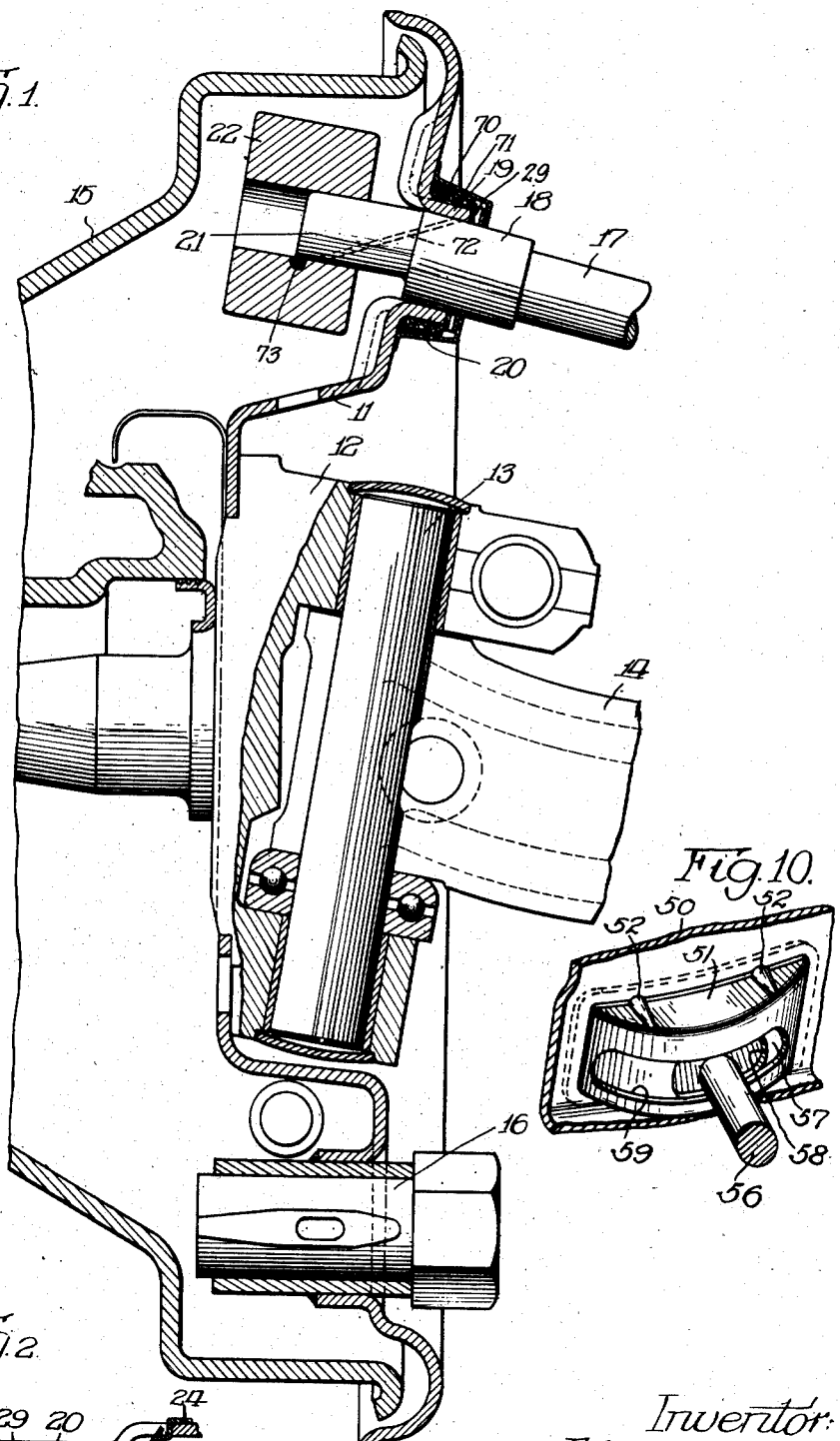
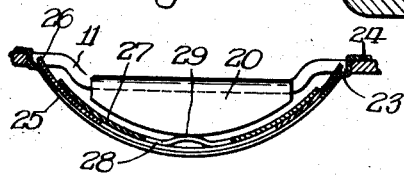
Inventor:
Edwin R. Evans, June 6, 1933.  E. R. EVANS  1,912,831
BOOT FOR BRAKES
Filed Nov. 10, 1930   2 Sheets-Sheet 2
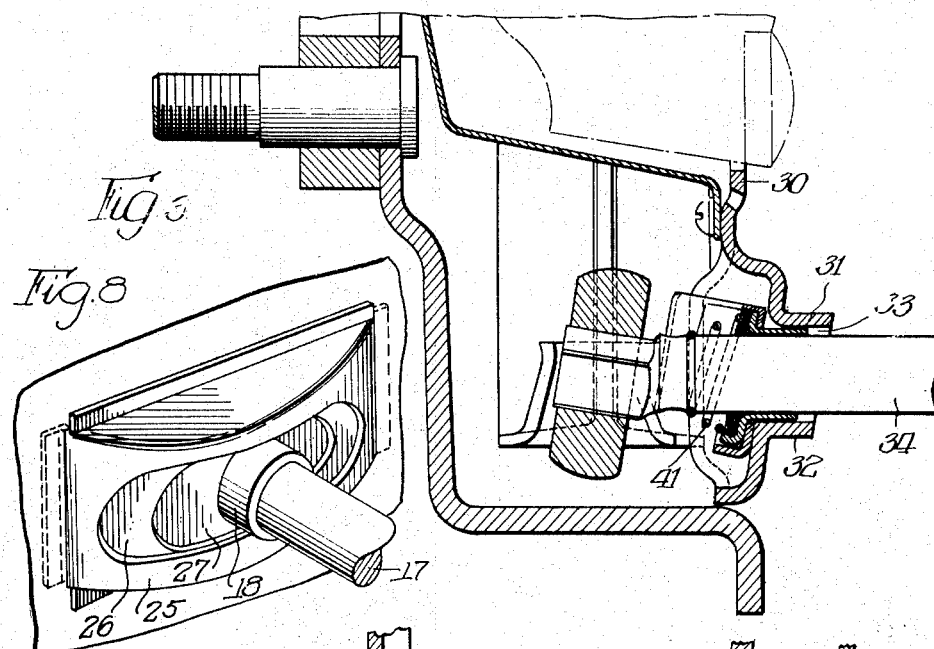
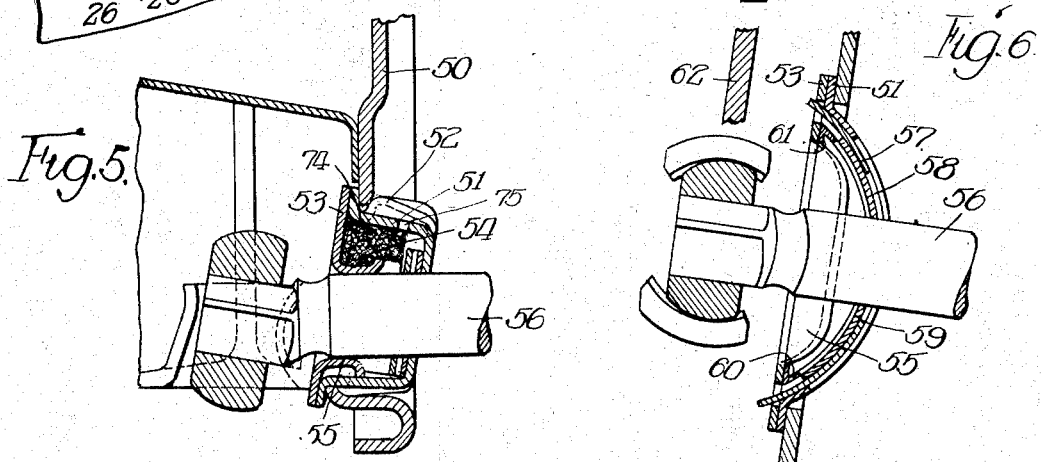
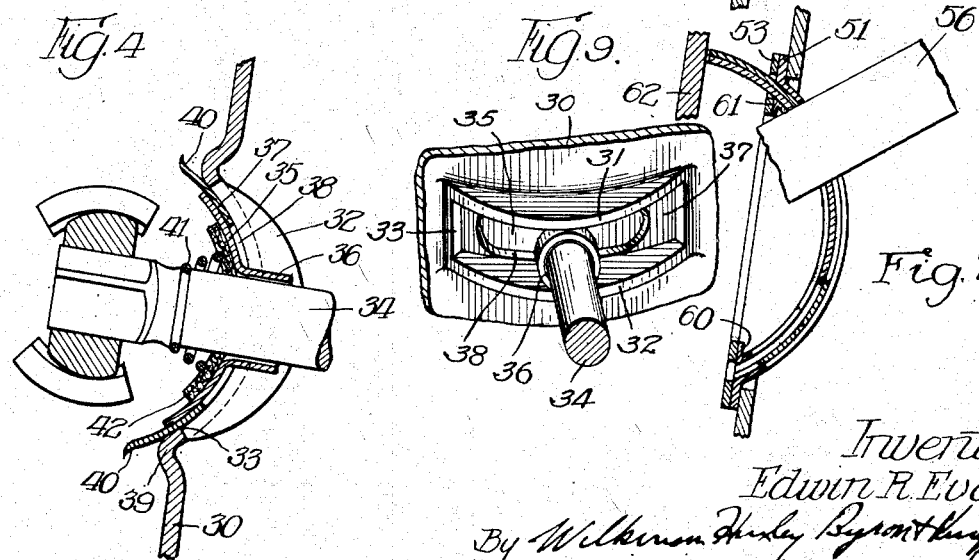
Inventor:
Edwin R. Evans, Patented June 6, 1933

1,912,831

UNITED STATES PATENT OFFICE

EDWIN R. EVANS, OF CHICAGO, ILLINOIS

BOOT FOR BRAKES

Application filed November 10, 1930. Serial No. 494,467.

This invention relates to a new and improved boot for brakes, and more particularly to a boot adapted to be formed of metal and to be carried by the brake backing plate to close the opening around the brake shaft.

In brake constructions of the type adapted for use upon automobiles where it is customary to provide brakes upon the front wheels or steering wheels, it is necessary in many forms of construction to provide an elongated opening in the backing plate in order that the brake shaft may not be moved laterally by the backing plate when the wheel is turned in steering the vehicle. With certain types of constructions flexible boots of leather or fabric have been used to close these openings. These boots are unsatisfactory for many reasons, and rapidly become worn out in use.

It is an object of the present invention to provide a boot which may be formed of metallic members sliding one upon another to close the opening in the backing plate.

It is an additional object to provide a boot of this character which is adapted to operate with small clearances within the backing plate.

It is a further object to provide a boot construction which is composed of but few parts and which is simple in design and adapted for commercial production.

It is also an object to provide a boot which is provided with means so that it may lock itself in place in the backing plate opening upon being forced into or through said opening.

It is an additional object to provide a construction in which an enlarged bearing carried by the backing plate is provided for supporting the transverse brake shafts.

Other and further objects will appear as the description proceeds.

I have illustrated certain preferred embodiments of my invention in the accompanying drawings in which—

Figure 1 is a fragmentary vertical section showing parts of a wheel brake and brake shaft and one form of boot associated therewith;

Figure 2 is a fragmentary horizontal section showing the boot of Figure 1;

Figure 3 is a fragmentary vertical section of a brake and shafts with a modified form of boot;

Figure 4 is a horizontal section through the construction of Figure 3;

Figure 5 is a view similar to Figure 3 but showing a further modified form;

Figure 6 is a horizontal section through the form of construction shown in Figure 5, with the parts in normal position; and Figure 7 is a view similar to Figure 6 but showing the brake shaft at one limit of angular movement.

Figure 8 is a perspective view of the form of invention illustrated in Figures 1 and 2.

Figure 9 is a perspective view of the form of invention illustrated in Figures 3 and 4.

Figure 10 is a perspective view of the form of invention illustrated in Figures 5, 6 and 7.

Referring first to the form of construction shown in Figures 1 and 2, the backing plate 11 is shown as secured to the wheel spindle 12, which latter is pivotally supported on the pin 13 carried by the axle 14. The brake drum 15 is rigidly secured to the wheel, which latter is not shown. The adjustment means 16 is carried by the backing plate for adjusting the pivoted end of the brake shoes, the shoes not being shown. The brake shaft 17 has an enlarged portion 18 which fits between the out turned flanges 19 and 20 formed in the backing plate 11. The reduced end 21 of the shaft 17 is squared and carries the brake operating cam 22. This cam 22 is slidably fitted on the squared end 21 so that the parts may adjust themselves to variations caused during turning by the fact that the axis of the cam 22 does not coincide with the axis of the steering pivot 13.

As shown in Figure 2, the bearing flange 20 has its outer edge formed on an arc as seen in plan view. The boot comprises an arcuate fixed member 23 having inwardly extending portions 24 at its ends adapted to be bent down against the inner face of the backing plate 11 to retain the parts in adjusted position. The fixed plate 23 is provided with the elongated opening 25 such as to permit free movement of the brake shaft throughout the turning range of the wheel. An intermediate movable member 26 is provided which is arcuate in shape and is fitted closely against the inner face of the fixed member 23. This member 26 is also provided with an elongated opening, this opening however being less in extent than the opening 25 in the member 23. A third member 27 is located inside of the member 26, this member 27 being provided with the opening 28 of the size adapted to closely fit the enlarged portion 18 of the brake shaft. The member 27 is provided with inwardly bent portions 29 adapted to engage the edges of the out-turned flanges 19 and 20. The part 27 being formed of resilient metal, this engagement with the flanges serves to maintain the sliding members 26 and 27 in intimate contact with the fixed member 23.

In the form of construction shown in Figures 3 and 4, the backing plate 30 is provided with the outturned flanges 31 and 32 which are located above and below the elongated opening 33 for receiving the brake shaft 34. The flange 32 is shown in plan view in Figure 4, which figure also more clearly shows the boot members. The boot member 35 is provided with the sleeve portion 36 which closely fits the brake shaft 34. This member has arcuate portions extending inwardly and engaging the inner face of the boot member 37. This boot member 37 is provided with an opening 38 through which the sleeve 36 of the member 35 passes. This opening 38 is somewhat elongated so as to permit relative movement between the members 35 and 37. The member 37 bears against the rounded portions 39 formed on the backing plate 30 at the ends of the opening 33. The member 37 is provided with the outturned ends 40 to limit its relative movement. The shaft 34 is provided with the circumferential recess into which is fitted the end coil of the spring 41. The opposite end coil of the spring 41 engages a packing disc 42 and presses this disc against the inner face of the boot member 35. This disc 42 may be formed of felt saturated with oil, or of other suitable material.

In the form of construction shown in Figures 5 to 7, the backing plate 50 is provided with the elongated opening into which is snapped the outer boot member 51. This member is provided with the bulged-out portions 52 which engage the upper face of the backing plate 50 and maintain the boot in assembled relation in the plate after it has been forced through from the inner side, as best shown in Figure 5. The inner boot member 53 consists of a flat plate having ends secured to the ends of the member 52, as best shown in Figure 6, and having an elongated opening therein with the metal at the upper and lower faces of the opening pressed outwardly to form the flanges 54 and 55. These flanges serve to engage and support the brake shaft 56. The outer movable member 57 is fitted against the arcuate inner face of the member 51, the member 57 being provided with an elongated opening 58 to permit passage of the brake shaft 56. The inner movable member 59 is fitted against the member 57 and is provided with an opening closely fitting the brake shaft 56. An arcuate spring 60 is fitted inside of the member 59 and bears against that member to hold the two movable members against the inner face of the outer fixed boot member 51. This spring 60 is provided with inturned ends 61 to engage the inner face of the inner fixed boot member 53.

The operation of these several boot constructions will be readily apparent from the above description. The form of construction shown in Figures 1 and 2 is placed upon the backing plate from its outer side, the members 24 passing through the opening and being bent outwardly, as shown in Figure 2, to retain the parts in place. The use of the pair of sliding members enables the large elongated opening in the fixed member to be fully closed at all times without the sliding members extending inside of the brake drum to an extent such as to bring them in contact with the brake shoe.

In the form of construction shown in Figures 3 and 4 the boot is inserted from the inner side of the backing plate and is held against the backing plate by the coil spring 41 which is carried by the brake shaft 34. Here there is no fixed member, but two slidable members, the opening in the backing plate being the equivalent of the opening in the fixed member, and the backing plate having outturned portions serving to support and guide the brake shaft.

The construction shown in Figures 5 to 7 is assembled from the inner side of the backing plate. It will be understood that the two fixed members 51 and 53 may be retained together by welding together their ends or in any other desired manner. The sliding members are then retained in place in between the members 51 and 53 and they are held together and rattle eliminated by means of the spring 60. Figure 7 clearly shows how the members slide upon each other in such manner as to completely close the arcuate opening in the backing plate without entering so far into the brake drum as to engage the web of the brake shoe, which has been indicated at 62 in Figure 7.

Various means may be provided for lubricating the boot and the adjacent parts. In Figure 1, a ring of felt or other oil retaining packing is shown at 70, an oil hole for adding lubricant being shown at 71. A drilled hole 72 is shown extending through member 18 to feed oil to the surfaces of the portion 21 and the cam 22. A wick is shown at 73 to hold oil and feed it to the cam surfaces which engage the shoes.

Similarly, in Figure 5 a felt wick is shown at 74 to feed oil to the boot members, an oil hole 75 being formed in the boot housing member. The construction of Figure 5 may be supplied with the other lubricating features of Figure 1 if desired.

While I have shown certain preferred embodiments of my invention these are to be understood as being illustrative only, as I contemplate such changes and modifications as come within the spirit and scope of the appended claims.

I claim:

1. In combination, a brake shaft, a backing plate having an opening therein to receive the shaft, the backing plate having a portion at the edge of the opening turned down to serve as an enlarged bearing for the shaft, and a metallic boot formed of a plurality of slidably associated members carried by the backing plate for closing the opening therein.

2. In combination, a brake shaft, a backing plate having an enlarged opening therein to receive the shaft, a boot comprising a plurality of interfitting members closing the opening about the shaft, and lubricating means carried in said boot.

3. In combination, a brake shaft, a backing plate having an enlarged opening therein to receive the shaft, a boot comprising a plurality of interfitting members closing the opening about the shaft, and lubricating retaining means carried in the boot, the boot being provided with an opening for the insertion of lubricant.

4. In combination, a brake shaft, a backing plate having an enlarged opening therein to receive the shaft, a metallic boot comprising a plurality of inter-fitting members closing the opening about the shaft, and lubricating means carried in said boot.

5. Brake mechanism comprising a backing plate, brake shoes and a brake shaft, an operating cam slidably carried by the shaft, the brake shaft extending through the backing plate, lubricant retaining means carried by the backing plate, and a lubricant passage formed in the brake shaft extending from the lubricant retaining means to the brake shaft face engaging the operating cam.

6. Brake mechanism comprising a backing plate, brake shoes and a brake shaft, an operating cam slidably carried by the shaft, the brake shaft extending through the backing plate, lubricant retaining means carried by the backing plate, a lubricant passage formed in the brake shaft extending from the lubricant retaining means to the brake shaft face engaging the operating cam, and a lubricant passage extending through the cam to the cam face engaging the brake shoes.

7. In a brake mechanism, a backing plate having a slotted opening therein, outturned flanges at the upper and lower sides of said slotted opening, a rotatable brake actuating shaft extending through said slotted opening, said flanges forming a bearing support for said shaft, the entire brake shaft being free to have linear movement with respect to said backing plate and angular movement in one plane with respect to said backing plate and a brake actuating cam slidably mounted on the end of said brake shaft on the inner side of said backing plate.

8. In a brake mechanism, a backing plate having a slotted opening therein, a brake actuating shaft extending through the slotted opening of said backing plate, a brake operating cam carried by the brake shaft on the inner side of said backing plate, said slotted opening forming a bearing support for said shaft permitting slidable movement of said shaft with respect to said backing plate and confining angular movement of said shaft to one plane and slidable members respectively carried by said backing plate and said shaft for closing said slotted opening.

9. In a brake mechanism, a backing plate having a slotted opening therein, a brake actuating shaft extending through the slotted opening of said backing plate, a brake actuating cam slidably mounted on said brake shaft on the inner side of said backing plate, the entire brake shaft being free to have linear movement with respect to said backing plate, said slotted opening forming a bearing support for said shaft confining angular movement of said shaft with respect to said backing plate to one plane and slidable members respectively carried by said backing plate and said brake shaft for closing the opening therebetween.

10. In a brake mechanism a backing plate having a slotted opening therein, a brake shaft extending through said slotted opening, a brake actuating cam slidably mounted on the inner end of said brake shaft, bearing means integral with said backing plate supporting said brake shaft with freedom for rotatable movement, linear movement and angular movement in one plane with respect to said backing plate and slidable members respectively carried by said backing plate and said shaft to close the opening therebetween throughout the angular movement of said shaft with respect to said backing plate.

11. In a brake mechanism a rotatable brake drum, a pair of brake shoes adapted to be expanded into engagement with said brake drum, a backing plate having a slotted opening therein, a brake shaft extending through said slotted opening, a brake actuating cam slidably mounted on the inner end of said brake shaft and retained against lateral movement by said brake shoes, bearing means rigid with said backing plate supporting said brake shaft with freedom for rotatable movement, linear movement and angular movement in one plane with respect to said backing plate and slidable members respectively carried by said backing plate and said shaft to close said slotted opening.

12. In combination, a brake shaft, a backing plate having an enlarged opening therein to receive the shaft, a plurality of interfitting members closing the opening about the shaft, and a portion of the backing plate extending under the shaft to form an enlarged elongated bearing therefor.

Signed at Chicago, Illinois, this 16th day of October, 1930.

EDWIN R. EVANS.